United States Patent [19]

Markovitz et al.

[11] Patent Number: 5,723,920
[45] Date of Patent: Mar. 3, 1998

[54] STATOR BARS INTERNALLY GRADED WITH CONDUCTIVE BINDER TAPE

[75] Inventors: Mark Markovitz; James J. Grant, both of Niskayuna; William E. Tomak, Scotia, all of N.Y.

[73] Assignee: General Electric Company, Schenectady, N.Y.

[21] Appl. No.: 321,959

[22] Filed: Oct. 12, 1994

[51] Int. Cl.[6] .................................................. H02K 3/14
[52] U.S. Cl. ............................. 310/42; 310/45; 310/213
[58] Field of Search ................................ 310/42, 43, 45, 310/260, 208, 213; 174/102 SC, 120 SC, 106 SC; 428/244, 247, 278, 324, 455

[56] References Cited

U.S. PATENT DOCUMENTS

| | | | |
|---|---|---|---|
| 4,091,139 | 5/1978 | Quirk | 428/244 |
| 4,388,546 | 6/1983 | Schwanzer | 310/196 |
| 5,066,881 | 11/1991 | Elton et al. | 310/213 |

FOREIGN PATENT DOCUMENTS

| | | |
|---|---|---|
| 1244896 | 5/1962 | Germany. |
| 26 41 406 | 9/1976 | Germany. |
| 18 A 1687/ 95-1 | 10/1995 | Germany. |
| CH 656 751 A5 | 11/1981 | Switzerland. |
| CH 656752 A5 | 11/1981 | Switzerland. |

Primary Examiner—Steven L. Stephan
Assistant Examiner—Judson H. Jones
Attorney, Agent, or Firm—Nixon & Vanderhye

[57] ABSTRACT

Stator bars for dynamoelectric machines are covered with an electrically conductive tape formed of a fabric support sheet carrying an electrically conductive polymeric binder system comprised of carbon particles dispersed in a polymeric matrix. The carbon particles are preferably selected from carbon black and/or graphite, and are present in the polymeric binder system in an amount of at least 5 percent by weight, based on the weight of the binder system. Low tip-up values of less than 0.025% and increased high voltage breakdown strengths of at least 700 VPM are obtained.

17 Claims, 1 Drawing Sheet

STATOR BARS INTERNALLY GRADED WITH CONDUCTIVE BINDER TAPE

FIELD OF INVENTION

The present invention relates generally to the internal grading (i.e., the step-wise change from conductor to insulator) of high voltage stator bars so as to consistently obtain low dissipation factor tip-up values and high voltage breakdown strength. In preferred forms, the present invention is embodied in insulated stator bars of dynamoelectric machines where the stator bar is wrapped or covered with an electrically conductive tape formed of a fabric support sheet which carries a polymeric binder system comprised of carbon particles dispersed in a polymeric matrix.

BACKGROUND AND SUMMARY OF THE INVENTION

Low dissipation factor tip-up values and high voltage breakdown strength are desirable properties for insulated stator bars used in dynamoelectric machines, such as electrical power generators. The tip-up value is an indication of void content in an insulated stator bar. Low dissipation factor tip-up values are desirable since they are indicative of a relatively small difference in dissipation factors at different electrical stresses and thereby provide an indirect measure of insulation efficacy. High voltage breakdown strengths, on the other hand, are desirable since the stator could then be more durable in extremely high voltage environments.

Previous attempts to achieve low tip-up values in insulated stator bars have included the use of conductive paints, usually based on carbon-filled epoxy binders, to coat the top and bottom edges of bare stator bars before the mica-based groundwall insulation is applied. While conductive paints reduce the tip-up values somewhat as compared to tip-up values associated with unpainted stator bars, their use has not resulted in sufficiently low tip-up values being obtained.

Furthermore, conductive paints for internal grading are inconvenient to use in a manufacturing plant due to the need to supply a special work station where the paint can be applied carefully on the specified locations of the stator bars. The volatile organic compounds used as paint solvents and thinners can also create a safety hazard in the work area. The use of carbon-filled conductive paints is an inherently untidy process, irrespective of the care taken by the workers to carefully apply the paint. Finally, the application of conductive paints to stator bars is a time consuming process since the painted bars must be allowed to dry before they can be handled or moved to another work station.

As a result, the prior attempt to internally grade insulated high voltage stator bars by the use of conductive carbon-filled conductive paints has not been a satisfactory solution to the problems associated with obtaining low tip-up values and high voltage breakdown strengths. What has been needed, therefore, is a means whereby insulated high voltage stator bars could be conveniently internally graded so as to achieve both low tip-up values as well as increased high voltage breakdown strength. It is towards fulfilling such needs that the present invention is directed.

Broadly, the present invention is directed to insulated high voltage stator bars in which the stator bars are wrapped or covered with a conductive tape. The conductive tape includes a fabric support sheet carrying a polymeric binder system. The fabric support sheet is most preferably a woven fabric formed of glass fibers, but other synthetic fiber materials which are compatible with the groundwall insulating materials used on the stator bar could also be used.

The electrically conductive polymeric binder system, on the other hand, is a blend of carbon particles dispersed in a polymeric matrix. The conductive tape is most preferably wound around the stator bar so as to be butt-lapped—i.e., so that the edges of successive adjacent turns of the tape wound around the stator bar are in abutting relationship with substantially no overlap.

The electrical resistance range of the conductive tape according to this invention can be "engineered" based on carbon particle density in the polymeric matrix and/or amount of pick-up of the conductive polymeric binder onto the fabric support. In this regard, the tapes of this invention may be provided with electrical resistance values in the range between $1\times10^3$ to $1\times10^9$, and more preferably between $2\times10^4$ to $1\times10^6$, so that desired internal grading of the stator bars may be achieved.

Further aspects and advantages of this invention will become apparent after careful consideration is given to the following detailed description of the following preferred exemplary embodiments thereof.

BRIEF DESCRIPTION OF THE ACCOMPANYING DRAWING

Reference will hereinafter be made to the accompanying drawing FIG. 1 which is an end elevational view of a stator bar which embodies the present invention.

DETAILED DESCRIPTION OF THE PREFERRED EXEMPLARY EMBODIMENTS

Figure 1:
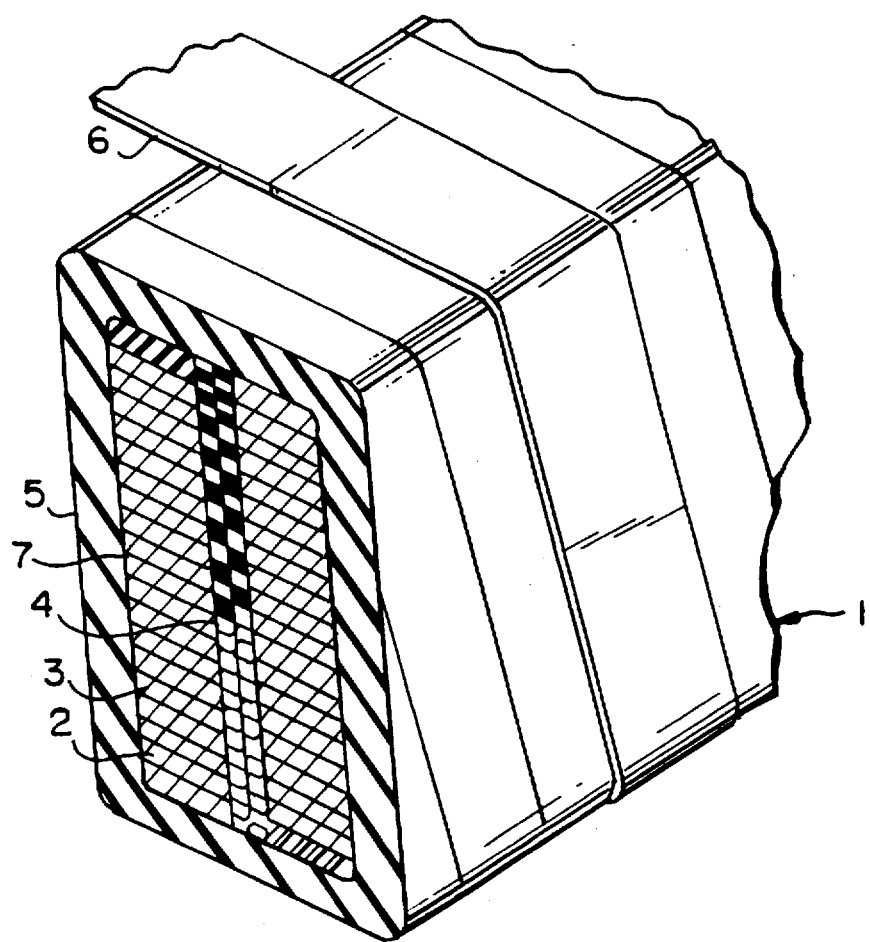

As used herein and in the accompanying claims, the term "tip-up value"(hereinafter sometimes abbreviated "TUV") and like terms are meant to refer to the difference in percent dissipation factor for generator stator bars measured at 10 and at 100 volts per mil, VPM. In this regard, the stator bars covered with the conductive tape of this invention will exhibit TUV's of less than 0.250%, and usually will be within the range between about −0.250% to about 0.150%. Furthermore, the insulated stator bars using the conductive tape in accordance with the present invention will likewise exhibit breakdown strengths of greater than about 700 VPM.

The fabric support sheet employed in the conductive tapes of this invention can be formed from virtually any fibrous material which is compatible with the groundwall insulating materials used in the stator bars of dynamoelectric machines, such as electrical power generation equipment. Examples of such materials include glass, polyesters, polyacrylics, polyamides and the like. Preferably, however, the fabric support sheet is a woven fabric formed of glass fibers (e.g., E-type glass fibers). Most preferably, the fabric support sheet employed in this invention is a plain weave construction having between about 40 to about 60 warp ends per inch, between about 25 to about 35 filling picks per inch, and a weight of between about 1.00 to about 3.00 oz/yd$^2$.

The physical dimensions of the fabric support sheet are not critical. Thus, when the fabric support sheet is a woven glass fiber fabric, the sheet may have a thickness dimension between about 2.0 mils to about 4.3 mils. However, fabric support sheets having thicknesses outside such exemplary range may also be employed.

As mentioned briefly above, the fabric support sheet carries an electrically conductive polymeric binder system comprised of carbon particles dispersed in a polymeric matrix. Virtually any suitable particulate carbon material may be used in the practice of this invention. Preferred, however, are carbon blacks and graphites having an average particle size of between about 0.1 to about 40 millimicrons, preferably between about 15 to 30 millimicrons, and a bulk density of less than about 25 lbs/ft$^3$. These materials are available commercially from a number of different sources, for example, the Vulcan™ carbon blacks available from Cabot Corp., as well as the natural or synthetic graphite powders available from UCAR Carbon Co., Lonza Inc. Superior Graphite Co., Asbury Graphite Mills and the like.

The polymeric matrix may be virtually any polymeric material which is suitable for use in high voltage environments, such as linear copolymers of epichlorohydrin and bisphenol A, epoxies, unsaturated polyesters, bismaleimides, polyimides, silicone and cyanate ester resins, acrylonitrile-butadiene-styrene (ABS) resins, neoprene, polyamide-imides, polybut terephthalate (PBT), polycarbonates, polydimethylsiloxanes, polyetherketones, polyetherimides, polyethersulfones, polyethylenes, polyethylene terephthalate (PET), polyimides, polymethyl methacrylates, polypropylene, polystyrene, polysulfones and polyurethanes.

Particularly preferred, however, are linear copolymers derived from epichlorohydrin and bisphenol A comonomers. These preferred copolymers are most preferably used with methyl ethyl ketone, glycol ether, or glycol ether ester as a solvent. The preferred linear copolymers of epichlorohydrin and bisphenol A will generally have weight average molecular weight of greater than about 15,000 (more preferably between about 40,000 and 200,000), a hydroxyl content of less than about 0.40 eq./100 grams, and an epoxide content of less than about 0.025 eq./100 grams. Such preferred linear copolymers of epichlorohydrin and bisphenol A are available commercially from a number of sources, for example, the EPOTUF®38-525 resin from Reichhold Chemical, Inc., the EPONOL®Resins 53 and 55 from Shell Chemical Co., and the GZ-488 resins from Ciba Geigy Co.

The carbon particles are present in the binder material so as to provide at least about 5.0%carbon based on the polymeric binder system solids, more preferably between about 8.0% to about 30% carbon based on the polymeric binder system solids, and most preferably between 10.0% to about 15.0% carbon based on the polymeric binder system solids. In this regard, when a solvent is employed, a polymeric binder material containing at least about 5.0 solids content (preferably about 25% solids) may be applied onto the fabric support sheet. However, when a solventless polymeric binder system is employed, the solids content is 100%. The carbon content and/or solids content can be controlled so as to achieve the desired pick-up of the polymeric matrix onto the fabric support sheet as well as controlling the resistance characteristics of the resulting tape.

The polymeric binder system may be applied onto the fabric support sheet in any expedient manner. For example, the polymeric binder may be liquified (e.g., via the presence of a solvent, or under heated conditions) and applied onto the support sheet surfaces via conventional padding, dipping, spraying or like coating techniques. The polymeric binder is then allowed to solidify (e.g., due to solvent evaporation, drying or cooling depending on the matrix resin that is employed, or curing is a resin and hardener is used) so as to leave a solidified carbon particle-containing polymeric matrix coating the fabric support sheet and/or within the fabric support sheet's interstices. The fabric that has been coated with the electrically conductive polymeric material is slit to tape, preferably having a width of a 0.625 to 1.25 inches.

A layer of such treated tape may then be wound around the stator bar in such a manner that substantially no edge overlap is present as between adjacent turns of the treated tape. That is, the treated tape is most preferably wound around the stator bar so that adjacent edges of the tape are in abutting relationship. Multiple layers of a mica tape are applied over the electrically conductive tape to obtain the desired insulation build on the stator bar. The mica tape can be a resin-rich tape that is subsequently processed in an autoclave, or a low binder tape that is subsequently vacuum-pressure impregnated with a resin and then cured. The thus formed insulated stator bar may then be assembled in a dynamoelectric machine according to conventional assembly techniques.

Mica tape is comprised of mica paper, a woven glass tape backer for taping strength, a non-woven polyester mat backer and an epoxy binder. The non-woven polyester mat backer can be replaced with a polymeric film such as Mylar polyester, Kapton polyimide, or Ultem polyeterimide.

In this regard, accompanying FIG. 1 depicts an end elevational perspective view of a stator bar 1 which embodies the present invention. The stator bar 1 includes a number of conducting copper strands 2 insulated from each other by strand insulation 3 in a conventional manner. The stator bar also includes strand separators 4. Ground insulation 5 is preferably formed by a plurality of layers of mica paper tape 6 wrapped around the exterior of the stator bar 1. Interposed between the stator bar strands 2 and the ground insulation 5 is a layer of the conductive tape 7 according to this invention. The conductive tape 7 therefore provides internal grading between the stator bar conductors 2 and the ground insulation 5.

The following non-limiting examples are provided for further understanding of this invention.

EXAMPLES

In the following examples, thirty-one (31) stator bars were made so as to investigate the efficacy of the present invention. The stator bars used in the examples were 13.8 KV bars that used an insulation system "Y" based on the following components: mica paper, woven glass tape backer for taping strength, non-woven polyester mat backer and an epoxy binder.

Three different styles of woven glass fabrics were employed in the Examples below, these being plain weave styles 1070 (ECD 450 1/0 warp yarns, ECD 900 1/0 fill yarns, 60 ends/in, 35 picks/in, 1.06 oz/yd$^2$, 2.0 mils thick), 1610 (ECG 150 1/0 warp and fill yarns, 32 ends/in, 28 picks/in, 2.40 oz/yd$^2$ and 4.3 mils thick), and 1675 (ECDE 150 1/0 warp and fill yarns, 40 ends/in, 32 picks/in, 2.85 oz/yd$^2$, and 4.3 mils thick).

The percent dissipation factor at 10 and 100 VPM were measured on the bars. Some of the bars were tested at two locations to obtain two sets of readings. In those instances, the two sets of readings obtained with two separate electrodes have been designated with the suffixes "A" and "B" associated with the respective bar number in the accompanying Tables.

EXAMPLE 1 (Comparative)

Seven 13.8 KV build bars were insulated with mica paper tape system "Y" that included an epoxy binder. No internal grading was used for these bars. The percent dissipation factor and tip-up values that resulted are summarized in Table 1 below showing a mean tip-up value of 1.055, ranging from 0.706 to 1.466.

TABLE 1

| Bar No. | % Dissipation Factor @ 25° C. (60 Hertz) | | Tip-Up (%) |
|---|---|---|---|
| | 10 VPM | 100 VPM | |
| 1A | 0.419 | 1.364 | 0.945 |
| 1B | 0.490 | 1.470 | 0.980 |
| 2A | 0.464 | 0.280 | 0.816 |
| 2B | 0.454 | 1.920 | 1.466 |
| 3 | 0.477 | 1.625 | 1.148 |
| 4A | 0.433 | 1.422 | 0.989 |
| 4B | 0.444 | 1.510 | 1.066 |
| 5 | 0.441 | 1.690 | 1.249 |
| 6A | 0.474 | 1.446 | 0.972 |
| 6B | 0.468 | 1.740 | 1.272 |
| 7 | 0.344 | 1.050 | 0.706 |

EXAMPLE 2 (Comparative)

Thirteen 13.8 KV build bars were insulated with mica tape system "Y" and seven different conductive paints were used for internal grading. The paints differed from one another only in the thermosetting epoxy binders and carbon content used as conductive filler. Specifically, the conductive paints which were used in this Example 2 are as follows:

| Bar No(s). | Conductive Paint Composition (Percentages Based on Solids Weight) |
|---|---|
| 8–12 & 12 | epoxy paint which contained 9.07% accelerator, 47.5% graphite (Dixon-Ticonderoga #057), with solids content of 60.0% in methyl ethyl ketone |
| 11 & 13 | epoxy paint (epoxy novolac and a liquid bisphenol A-diglycidyl ether opxy resin in a 70:30 ratio) which contained 6.96% accelerator, and 47.5% graphite (Dixon-Ticonderoga #057) with solids content of 60.0% in methyl ethyl ketone |
| 14 | epoxy paint (epoxy novolac and a liquid bisphenol A-diglycidyl ether opxy resin in a 50:50 ratio) which contained 6.96% accelerator, and 47.5% graphite (Dixon-Ticonderoga #057) with solids content of 60.0% in methyl ethyl ketone |
| 15 | epoxy paint (epoxy novolac and a liquid bisphenol A-diglycidyl ether opxy resin in a 50:50 ratio) which contained 18.0% carbon (Cabot Corp. XC-72R) with solids content of 50.0% in solvent blend of toluene, xylene and 2-propanol |
| 16 | epoxy paint (epoxy novolac and a liquid bisphenol A-diglycidyl ether opxy resin in a 70:30 ratio) which contained 18.0% carbon (Cabot Corp. XC-72R) with solids content of 55.0% in solvent blend of xylene and methyl ethyl ketone |
| 17 & 18 | epoxy paint (epoxy novolac and 2-ethyl-4-methyl-imidazole curing agent in a 100.0:3.0 weight ratio) which contained 18.0% carbon (Cabot Corp. XC-72R) with solids content of 55.0% in solvent blend of xylene and methyl ethyl ketone |
| 19 & 20 | epoxy paint (epoxy novolac and 2-ethyl-4-methyl-imidazole curing agent in a 100.0:6.0 weight ratio) which contained 18.0% carbon (Cabot Corp. XC-72R) with solids content of 55.0% in solvent blend of xylene and methyl ethyl ketone |

The bars in Example 2 were identical to those used in Example 1 above except for the internal grading paints that were used in Example 2. As is evident from the results recorded below in Table 2, while the paints caused the mean tip-up to decrease from 1.055 to 0.741, within the range of 0.280 to 1.243, the tip-up values were still high.

TABLE 2

| Bar No. | % Dissipation Factor @ 25° C. (60 Hertz) | | Tip-Up (%) |
|---|---|---|---|
| | 10 VPM | 100 VPM | |
| 8A | 0.727 | 1.593 | 0.866 |
| 8B | 0.865 | 1.420 | 0.555 |
| 9A | 0.862 | 1.420 | 0.558 |
| 9B | 0.977 | 2.220 | 1.243 |
| 10 | 0.860 | 1.700 | 0.840 |
| 11 | 0.964 | 1.677 | 0.713 |
| 12A | 1.110 | 1.380 | 0.280 |
| 12B | 0.535 | 1.563 | 1.028 |
| 13A | 0.624 | 1.303 | 0.679 |
| 13B | 0.673 | 1.208 | 0.535 |
| 14A | 0.617 | 1.230 | 0.613 |
| 14B | 0.838 | 1.542 | 0.704 |
| 15A | 0.395 | 1.036 | 0.641 |
| 15B | 0.397 | 1.005 | 0.608 |
| 16A | 0.398 | 1.195 | 0.797 |
| 16B | 0.406 | 1.099 | 0.693 |
| 17A | 0.687 | 1.400 | 0.713 |
| 17B | 0.448 | 1.277 | 0.829 |
| 18A | 0.670 | 1.560 | 0.890 |
| 18B | 0.484 | 1.353 | 0.869 |
| 19A | 0.497 | 1.331 | 0.834 |
| 19B | 0.716 | 1.357 | 0.641 |
| 20A | 0.397 | 1.261 | 0.864 |
| 20B | 0.475 | 1.267 | 0.792 |

EXAMPLE 3 (Invention)

Three styles of woven glass fabrics were coated with a mixture made by dispersing 7.06 parts by weight (pbw) of carbon black (Vulcan™ XC-72 R, Cabot Co.) in a solution of 40.00 pbw of a high molecular weight linear copolymer of epichlorohydrin and bisphenol A (EPOTUF™ 38-525, Reichhold Co.) in 141.18 pbw of methyl ethyl ketone. This mixture corresponded to 15.0% carbon based on binder solids and 25.0% solids. The styles of woven glass were #1070 (2.0 mils thick), #1610 (4.3 mils thick) and #1675 (4.3 mils thick). The treated woven glass fabrics were dried to remove solvent and then slit to tapes having a width of 1.0 or 1.25 inches. The treated glass tapes were flexible and had surface resistance values of: $2.2 \times 10^4 - 9 \times 10^4$ ohms per square, $5 \times 10^4 - 1 \times 10^5$ ohms per square, and $2 \times 10^4 - 1 \times 10^6$ ohms per square. The glass tapes were butt-lap taped around bare bars and then insulated with the same mica tape system "Y" used in Examples 1 and 2. As evidenced by the data in Table 3 below, the five bars that were internally graded with the glass tapes resulted in tip-up values that were consistently low and ranged from −0.165 to 0.112.

TABLE 3

| Bar No. | % Dissipation Factor @ 25° C. (60 Hertz) | | Tip-Up (%) |
|---|---|---|---|
| | 10 VPM | 100 VPM | |
| 21A | 0.483 | 0.550 | 0.067 |
| 21B | 0.454 | 0.547 | 0.093 |
| 22A | 0.374 | 0.479 | 0.105 |
| 22B | 0.364 | 0.476 | 0.112 |
| 23A | 0.416 | 0.506 | 0.090 |
| 23B | 0.455 | 0.535 | 0.080 |

TABLE 3-continued

| Bar No. | % Dissipation Factor @ 25° C. (60 Hertz) | | Tip-Up (%) |
| --- | --- | --- | --- |
| | 10 VPM | 100 VPM | |
| 24 | 0.249 | 0.300 | 0.051 |
| 25 | 0.864 | 0.699 | −0.165 |

EXAMPLE 4 (Invention)

Woven glass fabric (style #1610) was coated with a mixture made by dispersing 5.45 pbw of carbon black (Vulcan™ XC-72 R, Cabot Co.) in a solution of 40.00 pbw of a high molecular weight linear copolymer of epichlorohydrin and bisphenol A (EPOTUF™ 38-525, Reichhold Co.) in 136.35 pbw of methyl ethyl ketone. This mixture corresponded to 12.0% carbon based on binder solids and 25.0% solids. The treated glass fabric was dried to remove the solvent and then slit to form tapes having widths of 0.625 and 1.25 inches. Several glass tape lots treated with the 12.0% carbon mixture had a surface resistance range of $5 \times 10^4$ to $1 \times 10^6$ ohms per square.

The glass tape was butt-lap taped on bare bars and then insulated with the same mica paper tape system "Y" that was used in the bars of Examples 1 and 2, above. Three bars internally graded with the glass tapes made with the 12.0% carbon mixture had tip-up values that ranged from −0.043 to 0.097% as shown in the data below in Table 4.

TABLE 4

| Bar No. | % Dissipation Factor @ 25° C. (60 Hertz) | | Tip-Up (%) |
| --- | --- | --- | --- |
| | 10 VPM | 100 VPM | |
| 26 | 0.383 | 0.340 | −0.043 |
| 27 | 1.009 | 1.078 | 0.069 |
| 28 | 0.703 | 0.800 | 0.097 |

EXAMPLE 5 (Invention)

A woven glass cloth (style #1610) was treated with a mixture made by dispersing 4.94 pbw of carbon black (Vulcan™ XC-72 R, Cabot Co.) in a solution of 40.00 pbw of a high molecular weight linear copolymer of epichlorohydrin and bisphenol A (EPOTUF™ 38-525, Reichhold Co.) in 134.82 pbw of methyl ethyl ketone. This mixture corresponded to 11.0% carbon based on binder solids and 25.0% solids. The surface resistance range after drying to remove solvent was $3 \times 10^4$ to $1 \times 10^5$ ohms per square. The treated glass fabric was slit to form a 1.0-inch wide tape which was butt-lap taped on a bare bar. The bar was insulated with the same mica paper tape system "Y" that was used in the bars of Examples 1 and 2, above. Bar no. 29 internally graded with the tape of this Example 5 exhibited a tip-up value of 0.116 as shown in the following Table 5.

TABLE 5

| Bar No. | % Dissipation Factor @ 25° C. (60 Hertz) | | Tip-Up (%) |
| --- | --- | --- | --- |
| | 10 VPM | 100 VPM | |
| 29 | 0.438 | 0.322 | −0.116 |

EXAMPLE 6 (Invention)

A 4-mil thick tape was made from a woven glass cloth (style #1675) that was coated with a mixture made from dispersing 4.44 pbw of carbon black (Vulcan™ XC-72 R, Cabot Co.) in a solution of 40.00 pbw of a high molecular weight linear copolymer of epichlorohydrin and bisphenol A (EPOTUF™ 38-525, Reichhold Co.) in 133.32 pbw of methyl ethyl ketone. This mixture corresponded to 10.0% carbon based on binder solids and 25.0% solids. The surface resistance range after drying to remove solvent was $9 \times 10^4$ to $1 \times 10^8$ ohms per square. The treated glass fabric was slit to form a 1.0-inch wide tape which was butt-lap taped on a bare bar. The bar was insulated with the same mica paper tape system "Y" that was used in the bars of Examples 1 and 2, above. Bar no. 30 internally graded with the tape of this Example 6 exhibited a tip-up value of −0.236 as shown in the following Table 6.

TABLE 6

| Bar No. | % Dissipation Factor @ 25° C. (60 Hertz) | | Tip-Up (%) |
| --- | --- | --- | --- |
| | 10 VPM | 100 VPM | |
| 30 | 0.683 | 0.447 | −0.236 |

EXAMPLE 7 (Comparative)

A 4-mil thick tape was made from a woven glass cloth (style #1675) that was treated with a solution of 40.00 pbw of a high molecular weight linear copolymer of epichlorohydrin and bisphenol A (EPOTUF™ 38-525, Reichhold Co.) in 120.00 pbw of methyl ethyl ketone. This treatment corresponded to 25.0% solids. The surface resistance range after drying to remove solvent was infinite because no carbon was present. The treated glass cloth was slit to form a 1.0-inch wide tape which was butt-lap taped on a bare bar. The bar was insulated with the same mica paper tape system "Y" that was used in the bars of Examples 1 and 2, above. Bar no. 31 which was wound with the tape of this Example 7 exhibited a tip-up value of 0.760 as shown in the following Table 7 thereby demonstrating that the pre-treated woven tape used to internally grade the bar must contain a conductive filler, such as carbon or graphite particles to achieve low tip-up values.

TABLE 7

| Bar No. | % Dissipation Factor @ 25° C. (60 Hertz) | | Tip-Up (%) |
| --- | --- | --- | --- |
| | 10 VPM | 100 VPM | |
| 31 | 0.410 | 1.170 | 0.760 |

EXAMPLE 8

Insulated stator bars were tested for breakdown strength immersed in oil to prevent flashover during testing. As shown in the following Table 8, there was a significant improvement in breakdown strength when the pre-treated woven glass tapes in accordance with the present invention were used for internal grading as exemplified in Examples 2–6 above. The surface resistance of the internal grading tapes used in the bars that were tested from breakdown strength ranged from $2 \times 10^4$ to $1 \times 10^8$ ohms per square.

TABLE 8

| Bar No. | Example No. | Comments | Breakdown Strength (VPM) |
|---|---|---|---|
| 3 | Example 1 (Comparative) | No internal grading | 616 |
| 7 | Example 1 (Comparative) | No internal grading | 699 |
| 10 | Example 2 (Comparative) | Internal grading with paints | 597 |
| 11 | Example 2 (Comparative) | Internal grading with paints | 632 |
| 31 | Example 7 (Comparative) | Glass tape, no carbon, infinite resistance | 603 |
| 24 | Examples 3–6 (Invention) | Internal grading with glass tapes, contain carbon, $2 \times 10^4$ to $1 \times 10^8$ ohms/square | 743 |
| 29 | Examples 3–6 (Invention) | Internal grading with glass tapes, contain carbon, $2 \times 10^4$ to $1 \times 10^8$ ohms/square | 714 |
| 30 | Examples 3–6 (Invention) | Internal grading with glass tapes, contain carbon, $2 \times 10^4$ to $1 \times 10^8$ ohms/square | 708 |
| 25 | Examples 3–6 (Invention) | Internal grading with glass tapes, contain carbon, $2 \times 10^4$ to $1 \times 10^8$ ohms/square | 711 |
| 27 | Examples 3–6 (Invention) | Internal grading with glass tapes, contain carbon, $2 \times 10^4$ to $1 \times 10^8$ ohms/square | 816 |
| 28 | Examples 3–6 (Invention) | Internal grading with glass tapes, contain carbon, $2 \times 10^4$ to $1 \times 10^8$ ohms/square | 767 |

Examples 1–7 above show the 10 to 100 VPM tip-up results of the thirty-one stator bars tested with the same insulation system, but differ in the absence of internal grading (Example 1), prior known technology (Example 2), internal grading with woven tapes pre-treated with a conductive binder in accordance with the present invention (Examples 3–6), and a control bar where the woven tape was pre-treated with the same binder that was used in Examples 3–6, but no carbon was used (Example 7). These data demonstrate the significant improvement in TUV's which are obtained by the present invention. Furthermore, Example 8 demonstrates the superior voltage breakdown strength achieved with the conductive tapes in accordance with the present invention which are used for internal grading as compared to bars that were either not internally graded or were internally graded with carbon-containing paints.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An insulated stator bar for a dynamoelectric machine comprised of a stator bar element, and an electrically conductive tape wrapped directly on the stator bar, wherein said conductive tape includes a woven fabric support sheet, and a polymeric binder system carried by said support sheet and comprised of carbon particles dispersed in a polymeric matrix.

2. The insulated stator bar as in claim 1, wherein said carbon particles are selected from carbon black and graphite.

3. The insulated stator bar as in claim 3, wherein fibers of said woven fabric are formed of at least one material selected from the group consisting of glass, polyesters, polyacrylics, polyamides.

4. The insulated stator bar as in claim 1, wherein said polymeric matrix is at least one polymer selected from the group consisting of linear copolymers of epichlorohydrin and bisphenol A, epoxies, unsaturated polyesters, bismaleimides, polyimides, silicone and cyanate ester resins, acrylonitrile-butadiene-styrene resins, neoprene, polyamide-imides, polybutylene terephthalate, polycarbonates, polydimethylsiloxanes, polyetherketones, polyetherimides, polyethersulfones, polyethylenes, polyethylene terephthalate, polyimides, polymethyl methacrylate, polypropylene, polystyrene, polysulfones and polyurethanes.

5. The insulated stator bar as in claim 1, wherein said fabric support sheet is a woven fabric of glass fibers, and wherein said polymeric matrix is a linear copolymer of epichlorohydrin and bisphenol A.

6. The insulated stator bar as in claim 1, wherein said carbon particles are present in an amount greater than at least about 5 percent by weight, based on the weight of the polymeric binder system.

7. The insulated stator bar as in claim 1 wherein said carbon particles are present in an amount between about 10 to about 15 percent by weight, based on the weight of the polymeric binder system.

8. An insulated stator bar for electrical power generation equipment comprising an electrically conductive tape covering the exterior surface of said stator bar, wherein said tape includes:

a woven glass fabric support sheet; and a polymeric binder system carried by said support sheet having carbon particles dispersed within a polymeric binder matrix consisting essentially of a linear copolymer of epichlorohydrin and bisphenol A, and wherein said insulated stator bar exhibits low tip-up values of less than about 0.250% and high voltage breakdown strength of greater than about 700 VPM.

9. The insulated stator bar as in claim 8, wherein said carbon particles are selected from carbon black and/or graphite.

10. The insulated stator bar as in claim 9, wherein said carbon particles are present in an amount of at least about 5 percent by weight, based on the weight of the binder system.

11. The insulated stator bar as in claim 9, wherein said carbon particles are present in an amount between about 10 to about 15 percent by weight, based on the weight of the binder system.

12. A method of internally grading an insulated stator bar for a dynamoelectric machine comprising directly wrapping the stator bar with an electrically conductive tape formed of a woven fabric support sheet carrying an electrically conductive polymeric binder system comprised of carbon particles dispersed in a polymeric matrix.

13. The method as in claim 12, wherein said carbon particles are selected from carbon black and graphite.

14. The method as in claim 12, wherein said fabric support sheet is a woven fabric formed of at least one material selected from the group consisting of glass, polyesters, polyacrylics, polyamides.

15. The method as in claim 12, wherein said polymeric matrix is at least one polymer selected from the group consisting of linear copolymers of epichlorohydrin and bisphenol A, epoxies, unsaturated polyesters, bismaleimides, polyimides, silicone and cyanate ester resins, acrylonitrile-butadiene-styrene resins, neoprene, polyamide-imides, polybutylene terephthalate, polycarbonates, polydimethylsiloxanes, polyetherketones, polyetherimides, polyethersulfones, polyethylenes, polyethylene terephthalate, polyimides, polymethyl methacrylate, polypropylene, polystyrene, polysulfones and polyurethanes.

16. The method as in claim 12, wherein said fabric support sheet is a woven fabric of glass fibers, and wherein said polymeric matrix is a linear copolymer of epichlorohydrin and bisphenol A.

17. The method as in claim 1, wherein said carbon particles are present in an amount greater than at least about 5 parts by weight, based on the weight of the polymeric binder system.

* * * * *